US006971019B1

(12) United States Patent
Nachenberg

(10) Patent No.: US 6,971,019 B1
(45) Date of Patent: Nov. 29, 2005

(54) HISTOGRAM-BASED VIRUS DETECTION

(75) Inventor: Carey S. Nachenberg, Northridge, CA (US)

(73) Assignee: Symantec Corporation, Cupertino, CA (US)

( * ) Notice: Subject to any disclaimer, the term of this patent is extended or adjusted under 35 U.S.C. 154(b) by 0 days.

(21) Appl. No.: 09/524,856

(22) Filed: Mar. 14, 2000

(51) Int. Cl.[7] .......................... G06F 11/30; G06F 12/14; H04L 9/32

(52) U.S. Cl. ........................................ 713/188; 713/187

(58) Field of Search ................................. 713/188, 187

(56) References Cited

U.S. PATENT DOCUMENTS

| 5,696,822 | A | * | 12/1997 | Nachenberg | ................ | 713/200 |
|---|---|---|---|---|---|---|
| 5,712,583 | A | * | 1/1998 | Frankeny | ..................... | 327/158 |
| 5,796,989 | A | * | 8/1998 | Morley et al. | ................ | 703/26 |
| 5,826,013 | A | * | 10/1998 | Nachenberg | ................ | 713/200 |
| 5,964,889 | A | | 10/1999 | Nachenberg | | |
| 6,067,410 | A | | 5/2000 | Nachenberg | | |
| 6,088,803 | A | * | 7/2000 | Tso et al. | .................... | 713/201 |

FOREIGN PATENT DOCUMENTS

WO    WO 99/15966    4/1999

OTHER PUBLICATIONS

Parkhouse, Jayne, "Pelican SafeTNet 2.0" [online], Jun. 2000, SC Magazine Product Review, [retrieved on Dec. 1, 2003]. Retrieved from the Internet <URL: http://www.sc-magazine.com/scmagazine/standalone/pelican/sc_pelican.html.

Padawer, "Microsoft P–Code Technology," [online]. Apr. 1992 [retrieved on Nov. 13, 2003]. Retrieved from the Internet: <URL: http://msdn.Microsoft.com/archive/en–us/dnarvc/html/msdn_c7pcode2.asp?frame=true.>, 6 pages.

"Frequently Asked Questions on Virus–L/comp.virus," [online]. Oct. 9, 1995 [retrieved on Nov. 25, 2003]. Retrieved from the Internet: <URL: http://www.claws–and–paws.com/virus/faqs/vlfaq200.shtml>, 53 pages.

LeCharlier et al., "Dynamic Detection and Classification of Computer Viruses Using General Behaviour Patterns," Proceedings of the Fifth International Virus Bulletin Conference, Boston, Mass., Sep. 20–22, 1995, 22 pages.

(Continued)

Primary Examiner—Gilberto Barrón
Assistant Examiner—Grigory Gurshman
(74) Attorney, Agent, or Firm—Fenwick+West LLP

(57) ABSTRACT

A virus detection system (VDS) (400) uses a histogram to detect the presence of a computer virus in a computer file. The VDS (400) has a P-code data (410) for holding P-code, a virus definition file (VDF) (412) for holding signature of known viruses, and an engine (414) for controlling the VDS. The engine (414) contains a P-code interpreter (418) for interpreting the P-code, a scanning module (424) for scanning regions of the file (100) for the virus signatures in the VDF (412), and an emulating module (426) for emulating instructions in the file. The emulating module (426) contains a histogram generation module (HGM) (436) for generating a histogram of characteristics of instructions emulated by the emulating module (426) and a histogram definition module (HDF) (438) for specifying the characteristics to be included in the generated histogram. The emulating module (426) uses the generated histogram (500) to determine how many of the instructions of the computer file (100) to emulate. The emulating module (426) emulates (712) instructions and the HGM (436) generates a histogram of the instructions until active instructions are note detected. When active instructions are not detected (714), a P-code module is executed (722) to analyze the histogram (500) and determine whether a the file (100) contains a virus. The P-code can also decide to extend (728) emulation. The HGM (436) is also used to detect (822) the presence of dummy loops during virus decryption.

28 Claims, 9 Drawing Sheets

OTHER PUBLICATIONS

McCanne et al., "The BSD Packet Filter: A new Architecture for User–level Packet Capture," Preprint Dec. 19, 1992, 1993 Winter USENIX conference, San Diego, California, Jan. 25–29, 1993, 11 pages.

Leitold et al., "VIRus Searching and KILling Language," Proceedings of the Second International Virus Bulletin Conference, Sep. 1992, 15 pages.

Taubes, "An Immune System for Cyberspace," Think Research [online], vol. 34, No. 4, 1996 [retrieved on Dec. 15, 2003]. Retrieved from the Internet: <URL: http://domino.research.ibm.com/comm./wwwr_thinkresearch.nsf/pages/antivirus496.html>, 9 pages.

Ször, "Memory Scanning Under Windows NT," Virus Bulletin Conference, Sep. 1999, 22 pages.

Ször, "Attacks on Win32," Virus Bulletin Conference, Oct. 1998, 84 pages.

Nachenberg, "A New Technique for Detecting Polymorphic Computer Viruses," Thesis, University of Los Angeles, 132 pages, 1995.

PCT International Search Report, International Application No. PCT/US01/08058, Aug. 30, 2002, 4 pages.

PCT International Search Report, International Application No. PCT/US03/16445, Sep. 10, 2003, 4 pages.

* cited by examiner

HISTOGRAM-BASED VIRUS DETECTION

BACKGROUND

1. Field of the Invention

This invention pertains in general to detecting viruses within files in digital computers and more particularly to determining the number of instructions to emulate in order to decrypt and/or detect a virus.

2. Background Art

Simple computer viruses work by copying exact duplicates of themselves to each executable program file they infect. When an infected program executes, the simple virus gains control of the computer and attempts to infect other files. If the virus locates a target executable file for infection, it copies itself byte-for-byte to the target executable file. Because this type of virus replicates an identical copy of itself each time it infects a new file, the simple virus can be easily detected by searching in files for a specific string of bytes (i.e. a "signature") that has been extracted from the virus.

Encrypted viruses comprise a decryption routine (also known as a decryption loop) and an encrypted viral body. When a program file infected with an encrypted virus executes, the decryption routine gains control of the computer and decrypts the encrypted viral body. The decryption routine then transfers control to the decrypted viral body, which is capable of spreading the virus. The virus is spread by copying the identical decryption routine and the encrypted viral body to the target executable file. Although the viral body is encrypted and thus hidden from view, these viruses can be detected by searching for a signature from the unchanging decryption routine.

Polymorphic encrypted viruses ("polymorphic viruses") comprise a decryption routine and an encrypted viral body which includes a static viral body and a machine-code generator often referred to as a "mutation engine." The operation of a polymorphic virus is similar to the operation of an encrypted virus, except that the polymorphic virus generates a new decryption routing each time it infects a file. Many polymorphic viruses use decryption routines that are functionally the same for all infected files, but have different sequences of instructions.

These multifarious mutations allow each decryption routine to have a different signature. Therefore, polymorphic viruses cannot be detected by simply searching for a signature from a decryption routine. Instead, antivirus software uses emulator-based antivirus technology that loads the program into a software-based CPU emulator which acts as a simulated virtual computer. The program is allowed to execute freely within this virtual computer. If the program does in fact contain a polymorphic virus, the decryption routine is allowed to decrypt the viral body. The virus detection engine can then detect the virus by searching through the virtual memory of the virtual computer for a signature from the decrypted viral body.

Metamorphic viruses are not encrypted but vary the instructions in the viral body with each infection of a host file. Accordingly, metamorphic viruses often cannot be detected with a string search because they do not have static strings.

When detecting a virus through emulation, the antivirus engineers must tweak the emulation parameters in such a way that the virus detection engine slows down for all files and not just for possible virus host files. For example, assume that the emulation control module must detect a memory modification at least once every 500 instructions or it will assume it is emulating a non-virus and abort emulation. If a new virus were to be developed which decrypted a byte (i.e., performed a memory fetch and store) every 1000 instructions, the engineers would need to change the emulator's modification detection constant from 500 to 1000 instructions. This change means that all clean programs, as well as infected program, would need to be emulated for 1000 instructions before the programs could be excluded as not infected. Many recent viruses try to escape detection by increasing the number of dummy instructions between decryption instructions and, as a result, the virus detection engine must emulate a large number of instructions for each file. Accordingly, emulation-based virus detection schemes can be quite slow when analyzing files.

Accordingly, there is a need in the art for a virus detection scheme that can detect the presence of viruses through emulation but does not suffer the performance drawbacks of prior art virus detection schemes.

DISCLOSURE OF INVENTION

The above needs are met by a virus detection system (VDS) (400) that uses histograms to detect the presence of a computer virus in a computer file (100). The VDS (400) preferably includes a data file (410) holding P-code instructions, or other data-driven logic, for analyzing a histogram. The VDS (400) also includes a virus definition file (VDF) (412) containing virus signatures for known viruses. The VDS (400) is controlled by an engine (414) having a P-code interpreter (418) for interpreting the P-code in the data file (410). In addition, the engine (414) has a scanning module (424) for scanning a file or range of memory for virus signatures in the VDF (412) and an emulating module (426) for emulating code in the file (100) in order to decrypt polymorphic viruses and detect the presence of metamorphic viruses.

The emulating module (426) contains a histogram generation module (HGM) (436) for generating a histogram (500) from instructions emulated by the emulating module (426). The instruction characteristics tracked by the histogram (500) are specified by a histogram definition module (HDF) (438). In one embodiment, the HDF (438) can specify that the generated histograms track individual instructions, instructions matching a specified bit pattern, sequences of certain instructions, instructions calling operating systems functions, or any other pattern of instructions for which tracking is desired. In addition, the HDF (438) can specify that the generated histogram track the state of one or more registers or stacks in a virtual processor (432) or function calls that use arguments in the registers.

The engine (414) interprets the P-code in the P-code data file (410) and responds accordingly. In one embodiment, the P-code examines the entry points in the file (100) to determine whether the entry points might be infected with a virus. Those entry points and other regions of the file (100) commonly infected by viruses or identified by suspicious characteristics in the file, such as markers left by certain viruses, are posted (614) for scanning. Likewise, the P-code posts (618) entry points and staring contexts for regions of the file (100) that are commonly infected by viruses or bear suspicious characteristics for emulating. Using the P-code to preprocess regions of the file (100) and select only those regions or entry points that are likely to contain a virus for subsequent scanning and/or emulating allows the VDS (400) to examine files for viruses that infect places other than the main entry point in a reasonable amount of time. The P-code can also determine whether the file (100) is infected with a virus by using virus detection routines written directly into the P-code, thereby eliminating the need to scan for strings or emulate the file (100).

A region posted for string scanning is identified by a range of memory addresses. Preferably, the P-code merges postings having overlappings ranges so that a single posting specifies the entire region to be scanned. When an entry point is posted for emulating, the P-code specifies the emulation context, or starting state to be used for the emulation. An entry point can be posted multiple times with different contexts for each emulation.

The engine (414) uses the scanning module (424) to scan the regions of the file (100) that are posted for scanning by the P-code for the virus signatures in the VDF (412). If the scanning module (424) detects a virus, the VDS (400) preferably reports that the file (100) is infected and stops operation.

If the scanning module (424) does not find a virus in the posted regions, a preferred embodiment of the present invention optionally utilizes a hook to call (630) custom virus detection code. The hook allows virus detection engineers to insert a custom program into the VDS (400) and detect viruses that, for reasons of speed and efficiency, are better detected by custom code.

Then, the VDS (400) preferably uses the emulating module (426) to emulate the instructions at the posted entry points. During emulation, parts of a virtual memory (434) in which the instructions are emulated are preferably scanned every Q emulated instructions for known virus signatures. Furthermore, while the emulating module (426) emulates the instructions, the HGM (436) generates (712) a histogram of the instructions and/or instruction sequences specified by the HDF (438). If (714) N instructions are emulated without encountering an active instruction, where N is typically around 1500 in one embodiment, the emulating module (426) preferably halts emulation. An active instruction is one or more instructions that indicate decryption-like behavior. If the total number of instructions emulated exceeds a specified value, emulation is also halted.

Whenever emulation is halted, the scanning module (424) scans (716) the virtual memory (434) for virus signatures. If the scanning module (424) detects (718) a virus, the VDS (400) reports (720) that a virus was detected.

If the scanning module does not detect (718) a virus, the emulating module (426) preferably executes (722) the P-code histogram evaluation instructions to examine the histogram generated by the HGM (436). The P-code preferably determines (724) whether the emulated instructions contain a virus based on the presence or absence of histogram-tracked instructions. In addition, the P-code can decide (726) whether to extend emulation for another M instructions based upon the analysis of the histogram. If emulation is extended (728), the scanning module 424 preferably scans (730) for known virus signatures every Q instructions during emulation and after emulation is halted.

A preferred embodiment of the present invention also uses histograms to detect the presence of dummy loops in a virus. While emulating the instructions, the emulating module (426) keeps a record of (816) backward loop instructions and tracks the number of times that each loop instruction is emulated. If an active instruction is emulated (824), then the record of loop instructions is cleared (826) and the backward loop instructions are tracked anew. The HGM (436) also generates (812) a histogram, called the loop histogram, tracking characteristics of the emulated instructions. In one embodiment, the HGM (436) creates a separate loop histogram for each emulated loop.

When a backward loop instruction is emulated more than L times (818), the P-code instructions are executed (820) to analyze the loop histogram and determine whether the loop defined by the loop instruction is a dummy loop. To provide this functionality to the P-code, anti-virus engineers preferably study dummy loop code of known viruses and determine the dummy loop instruction characteristics of each virus.

DETAILED DESCRIPTION OF THE PREFERRED EMBODIMENTS

In order to accomplish the mischief for which they are designed, software viruses must gain control of a computer's central processing unit (CPU). Viruses typically gain this control by attaching themselves to an executable file (the "host file") and modifying the executable image of the host file at an entry point to pass control of the CPU to the viral code. The virus conceals its presence by passing control back to the host file after it has run by calling the original instructions at the modified entry point. As used herein, the term "virus" also includes other forms of malicious code such as "worms" and "Trojan horses," that can infiltrate and infect a computer system.

Viruses use different techniques to infect the host file. For example, a simple virus always inserts the same viral body into the target file. An encrypted virus infects a file by inserting an unchanging decryption routine and an encrypted viral body into the target file. A polymorphic encrypted virus (a "polymorphic virus") is similar to an encrypted virus, except that a polymorphic virus generates a new decryption routine each time it infects a file. A metamorphic virus is not encrypted, but it reorders the instructions in the viral body into a functionally equivalent, but different, virus each time it infects a file. Simple and encrypted viruses can typically be detected by scanning for strings in the viral body or encryption engine, respectively. Since polymorphic and metamorphic viruses usually do not have static signature strings, polymorphic and metamorphic viruses can typically be detected by emulating the virus until either the static viral body is decrypted or the virus otherwise becomes apparent. While this description refers to simple, encrypted, polymorphic, and metamorphic viruses, it should be understood that the present invention can be used to detect any type of virus, regardless of whether the virus fits into one of the categories described above.

A virus typically infects an executable file by attaching or altering code at or near an entry point of the file. An "entry point" is any instruction or instructions in the file, or a pointer to an instruction or instructions, that a virus can modify to gain control of the computer system on which the file is being executed. An entry point is typically identified by an offset from some arbitrary point in the file. Certain entry points are located at the beginning of a file or region and, thus, are always invoked when the file or region is executed. For example, an entry point can be the first instruction executed when a file is executed or a function within the file is called. Other entry points may consist of single instruction deep within a file that can be modified by a virus. For example, the entry point can be a CALL or JMP instruction that is modified to invoke viral code. Once a virus seizes control of the computer system through the entry point, the virus typically infects other files on the system.

Figure 1:
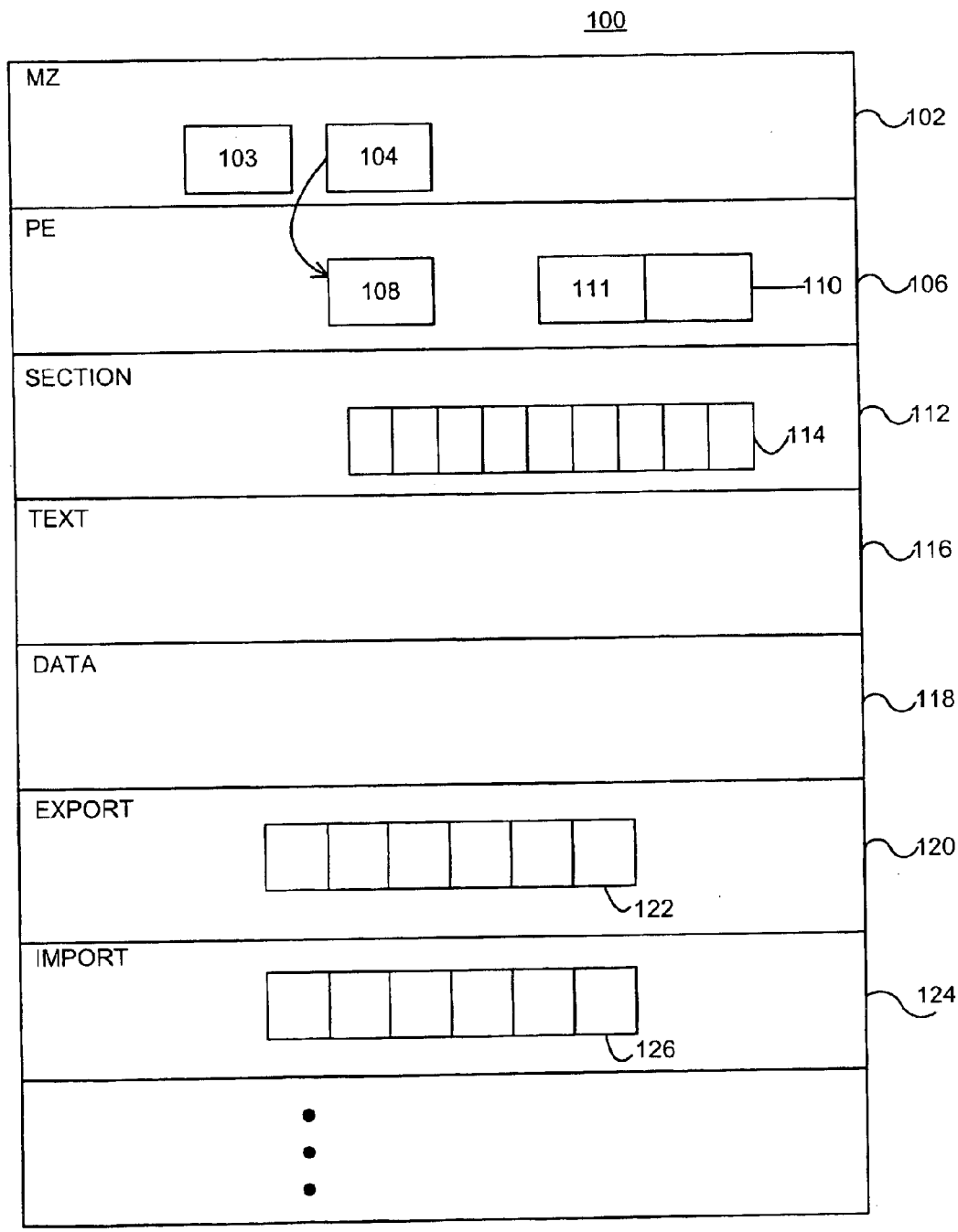
FIG. 1 is a high-level block diagram of an executable file 100 having multiple entry points that can be infected by a virus.

FIG. 1 is a high-level block diagram of an executable file 100 having multiple entry points that can be infected by a virus as described above. In the example illustrated by FIG. 1, the executable file is a Win32 portable executable (PE) file intended for use with a MICROSOFT WINDOWS-based operating system (OS), such as WINDOWS 98, WINDOWS NT, and WINDOWS 2000. Typically, the illustrated file 100 is of the type .EXE, indicating that the file is an executable file, or .DLL, indicating that the file is a dynamic link library (DLL). However, the present invention can be used with any file and is not limited to only the type of file illustrated in FIG. 1. APPLE MACINTOSH files, for example, share many similarities with Win32 files, and the present invention is equally applicable to such files.

The file 100 is divided into section containing either code or data and aligned along four kilobyte (KB) boundaries. The MS-DOS section 102 contains the MS-DOS header 102 and is marked by the characters "MZ". This section 102 contains a small executable program 103 designed to display an error message if the executable file is run in an unsupported OS (e.g., MS-DOS). This program 103 is an entry point for the file 100. The MS-DOS section 102 also contains a field 104 holding the relative offset to the start 108 of the PE section 106. This field 104 is another entry point for the file 100.

The PE section 106 is marked by the characters "PE" and holds a data structure 110 containing basic information about the file 100. The data structure 110 holds many data fields describing various aspects of the file 100. One such field is the "checksum" field 111, which is rarely used by the OS.

The next section 112 holds the section table 114. The section table 114 contains information about each section in the file 100, including the section's type, size, and location in the file 100. For example, entries in the section table 114 indicate whether a section holds code or data, and whether the section is readable, writeable, and/or executable. Each entry in the section table 114 describes a section that may have multiple, one, or no entry points.

The text section 116 holds general-purpose code produced by the compiler or assembler. The data section 118 holds global and static variables that are initialized at compile time.

The export section 120 contains an export table 122 that identifies functions exported by the file 100 for use by other programs. An EXE file might not export any functions but DLL files typically export some functions. The export table 122 holds the function names, entry point addresses, and export ordinal values for the exported functions. The entry point addresses typically point to other sections in the file 100. Each exported function listed in the export table 122 is an entry point into the file 100.

The import section 124 has an import table 126 that identifies functions that are imported by the file 100. Each entry in the import table 126 identifies the external DLL and the imported function by name. When code in the text section 116 calls a function in another module, such as an external DLL file, the call instruction transfers control to a JMP instruction also in the text section 116. The JMP instruction, in turn, directs the call to a location within the import table 126. Both the JMP instruction and the entries in the import table 126 represent entry points into the file 100. Additional information about the Win32 format is found in M. Pietrek, "Peering Inside the PE: A Tour of the Win32 Portable Executable File Format," Microsoft Systems Journal, March 1994, which is hereby incorporated by reference.

Figure 2:
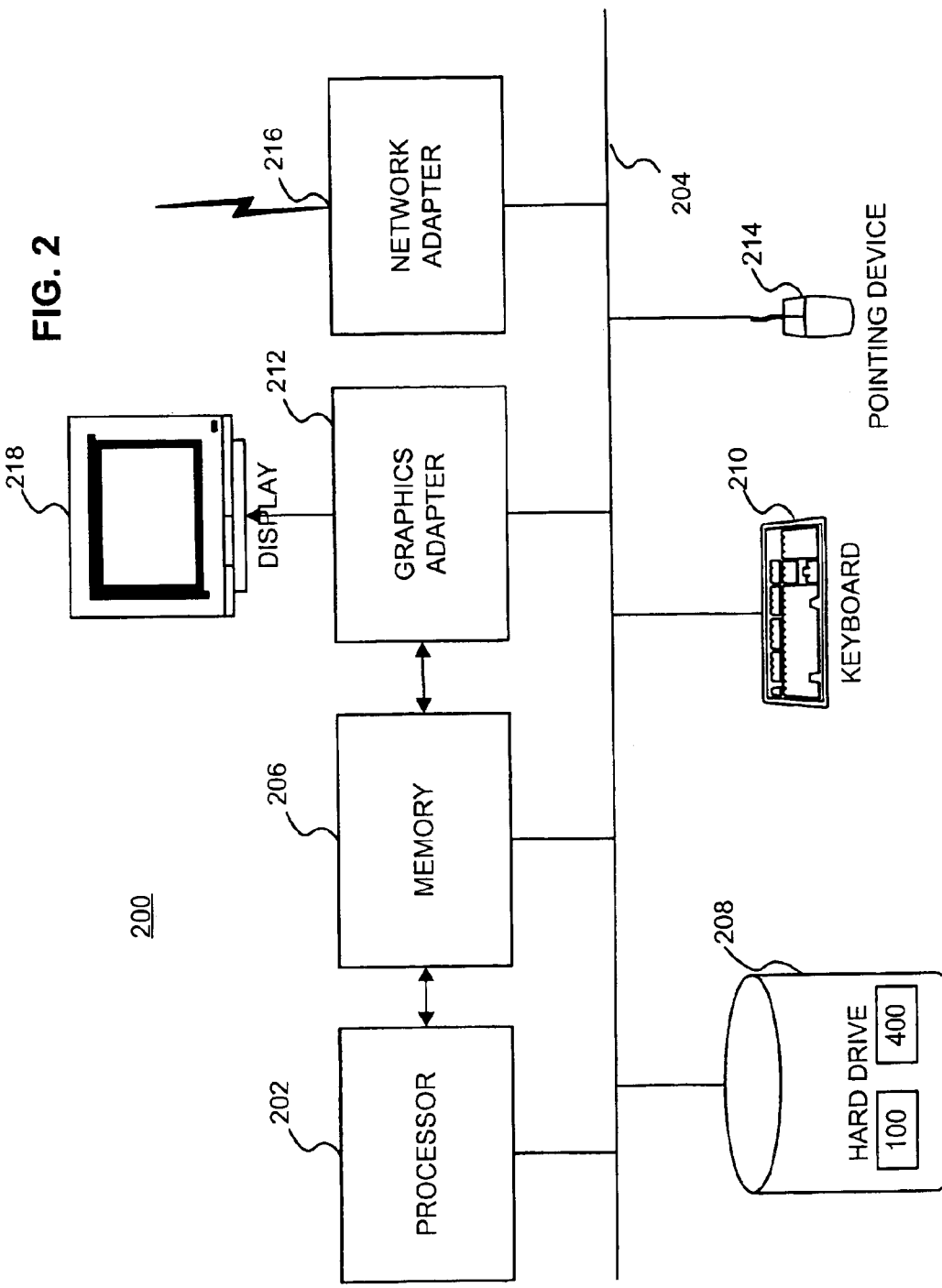
FIG. 2 is a high-level block diagram of a computer system 200 for storing and executing the file 100 and a virus detection system (VDS) 400.

FIG. 2 is a high-level block diagram of a computer system 200 for storing and executing the host file 100 and a virus detection system (VDS) 400. Illustrated are at least one processor 202 coupled to a bus 204. Also coupled to the bus 204 are a memory 206, a storage device 208, a keyboard 210, a graphics adapter 212, a pointing device 214, and a network adapter 216. A display 218 is coupled to the graphics adapter 212.

The at least one processor 202 may be any general-purpose processor such as an INTEL x86, SUN MICROSYSTEMS SPARC, or POWERPC compatible-CPU. The storage device 208 may be any device capable of holding data, like a hard drive, compact disk read-only memory (CD-ROM), DVD, or a solid-state memory device. The memory 206 holds instructions and data used by the processor 202. The pointing device 214 may be a mouse, track ball, light pen, touch-sensitive display, or other type of pointing device, and is used in combinations with the keyboard 210 to input data into the computer system 200. The graphics adapter 212 displays images and other information on the display 218. The network adapter 216 couples the computer system 200 to a local or wide area network.

Preferably, the host file 100 and program modules providing the functionality of the VDS 400 are stored on the storage device 208. The program modules, according to one embodiment, are loaded into the memory 206 and executed by the processor 202. Alternatively, hardware or software modules for providing the functionality of the VDS 400 may be stored elsewhere within the computer system 200.

Figure 3:
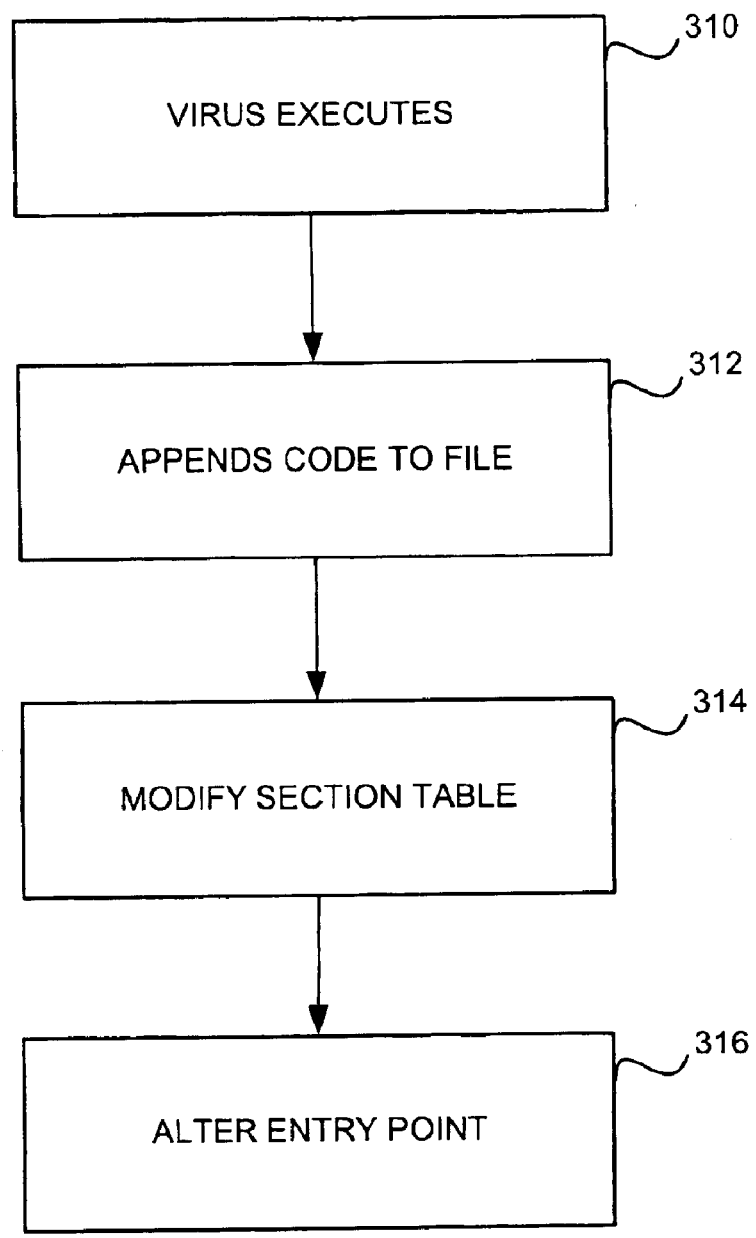
FIG. 3 is a flow chart illustrating steps performed by a typical virus when infecting the file 100.

FIG. 3 is a flow chart illustrating steps performed by a typical virus when infecting the host file 100. The illustrated steps are merely an example of a viral infection and are not representative of any particular virus. Initially, the virus executes 310 on the computer system 200. The virus may execute, for example, when the computer system 200 executes or calls a function in a previously-infected file.

When the host file 100 is opened, the virus appends 312 the viral code to a location within the file. For example, the virus can append the viral body to the slack space at the end of a section or put the viral body within an entirely new section. The virus can be, for example, simple, encrypted, polymorphic, or metamorphic.

The virus also modifies 314 the section table 114 to account for the added viral code. For example, the virus may change the size entry in the section table 114 to account for the added viral code. Likewise, the virus may add entries for new sections added by the virus. If necessary, the virus may mark an infected section as executable and/or place a value in a little used field, such as the checksum field 111, to discreetly mark the file as infected and prevent the virus from re-infecting the file 100.

In addition, the virus alters 316 an entry point of the file 100 to call the viral code. The virus may accomplish this step by, for example, overwriting the value in the field 104 holding the relative offset to the start 108 of the PE section 106 with the relative offset to virus code stored elsewhere in the file. Alternatively, the virus can modify entries in the export table 122 to point to sections of virus code instead of the exported functions. A virus can also modify the destination of an existing JMP or CALL instruction anywhere in the file 100 to point to the location of viral code elsewhere in the file, effectively turning the modified instruction into a new entry point for the virus.

Figure 4:
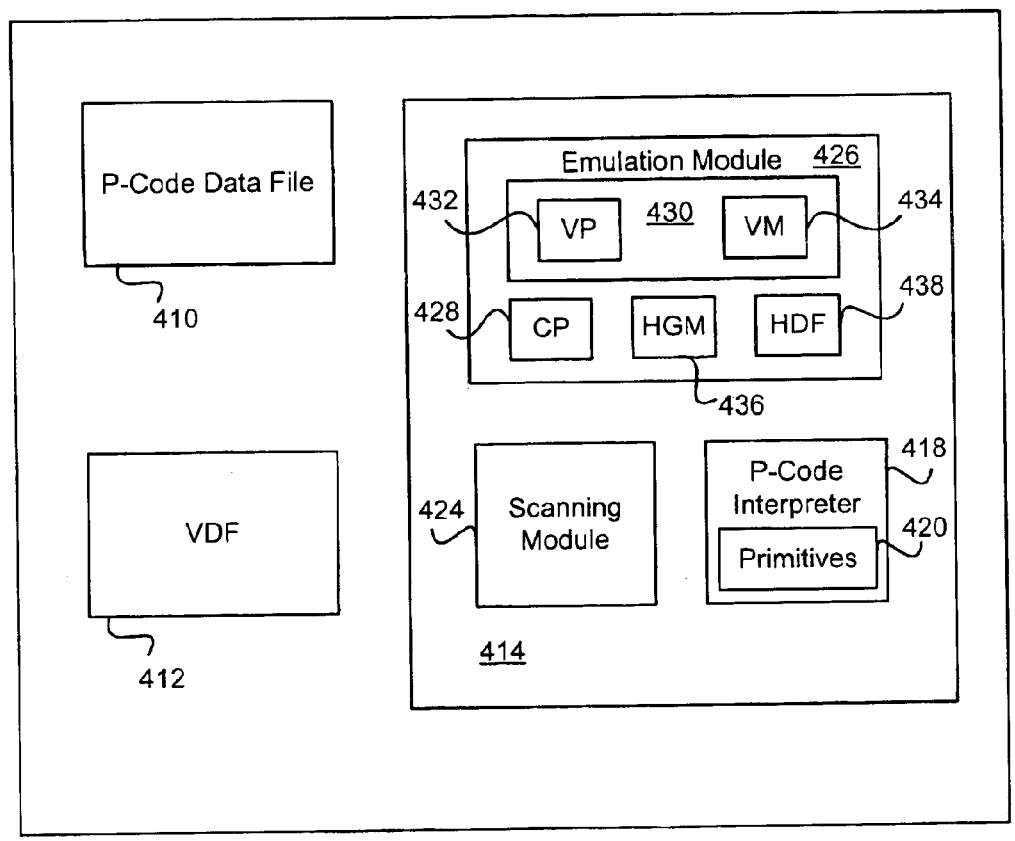
FIG. 4 is a high-level block diagram of the VDS 400 according to a preferred embodiment of the present invention.

FIG. 4 is a high-level block diagram of the VDS 400 according to a preferred embodiment of the present invention. The VDS 400 includes a P-code data file 410, a virus definition file (VDF) 412, and an engine 414. The P-code data file 410 preferably holds P-code instruction modules for examining the host file 100, examining a histogram, and detecting dummy loops. As used herein, "P-code" refers to program code for providing data-driven functionality. Preferably, the P-code instructions in the data file 410 are created by writing instructions in any computer language and then compiling the instructions into P-code. In addition, the functionality of the P-code can be replaced by other data-driven techniques. For example, a state machine can be utilized in combination with, or as an alternative to, the P-code to provide deterministic data-driven virus detection.

The VDF 412 preferably holds an entry or virus definition for each known virus. Each virus definition contains information specific to a virus or strain of viruses, including a signature for identifying the virus or strain. An entry in the VDF 412, according to an embodiment of the present invention, is organized as follows:

[VirusID]
0x2f41
[SigStart]
0x89, 0xb4, 0xb8, 0x02, 0x096, 0x56,DONE
[SigEnd]

Here, [VirusID] is a data field for a number that identifies the specific virus or virus strain. [SigStart] and [SigEnd] bracket a virus signature, which is a string of bytes characteristic of the virus or strain having Virus ID 0x2f41. The signature, for example, may identify the static encryption engine of an encrypted virus or the static viral body of a polymorphic virus. The virus signatures are used to detect the presence of a virus in a file (or in the virtual memory 434 after emulating), typically by performing a string scan for the bytes in the signature. In one embodiment of the present invention, the VDF 412 holds virus definitions for thousands of viruses.

The engine 414 controls the operation of the VDS 400. The engine 414 preferably contains a P-code interpreter 418 for interpreting the P-code in the P-code data file 410. The interpreted P-code controls the operation of the engine 414. In alternative embodiments where the data file 410 holds instructions in a format other than P-code, the engine 414 is equipped with a module for interpreting or compiling the instructions in the relevant format. For example, if the data file 410 holds JAVA instructions, the engine 414 preferably includes a JAVA Just-In-Time compiler.

The P-code interpreter 418 preferably includes special P-code function calls called "primitives" 420. The primitives 420 can be, for example, written in P-code or a native language, and/or integrated into the interpreter itself. Primitives 420 are essentially functions useful for examining the host file 100 and the virtual memory 434 that can be called by other P-code. For example, the primitives 420 perform functions such as opening files for reading, closing files, zeroing out memory locations, truncating memory locations, locating exports in the file, determining the type of the file, and finding the offset of the start of a function. The functions performed by the primitives 420 can vary depending upon the computer or operating system in which the VDS 400 is being used. For example, different primitives may be utilized in a computer system running the MACINTOSH operating system than in a computer system running a version of the WINDOWS operating system. In an alternative embodiment, some or all of the primitives can be stored in the P-code data file 410 instead of the interpreter 418.

The engine 414 also contains a scanning module 424 for scanning pages of the virtual memory 434 or regions of a file 100 for virus signatures held in the VDF 412. In one embodiment, the scanning module 424 receives a range of memory addresses as parameters. The scanning module scans the memory addresses within the supplied range for signatures held in the VDF 412.

The engine 414 also contains an emulating module 426 for emulating code in the file 100 starting at an entry point. The emulating module 426 includes a control program (CP) 428 for setting up a virtual machine 430 having a virtual processor 432 and an associated virtual memory 434. The virtual machine 430 can emulate a 32-bit MICROSOFT WINDOWS environment, an APPLE MACINTOSH environment, or any other environment for which emulation is desired. The virtual machine 430 uses the virtual processor 432 to execute code in the virtual memory 434 in isolation from the remainder of the computer system 200. Emulation starts with a given context, which specifies the contents of the registers, stacks, etc. in the virtual processor 432. During emulation, every page of virtual memory 434 that is read from, written to, or emulated through is marked.

The emulating module 426 also preferably contains a histogram generation module (HGM) 436 and a histogram data file (HDF) 438. The HGM 436 makes histograms of instructions emulated by the virtual processor 432. In one embodiment, the HGM 436 makes separate histograms for discrete periods of emulation. For example, the HGM 436 can make separate histograms for each iteration of a code loop performed by the emulated instructions. Likewise, the HGM 436 can make separate histograms for instructions between arbitrary emulation points set by the CP 428.

The HDF 438 specifies which instructions are tracked in the histogram made by the HGM 436. In one embodiment, the HDF 438 can specify that the generated histograms track individual instructions, instructions matching a specified bit pattern, sequences of certain instructions, instructions or instruction sequences that call operating system functions, or any other pattern of instructions that is desired. In addition, the HDF 438 can specify that the generated histogram track the state of one or more registers or stacks in the virtual processor 432 or function calls that use arguments in the registers or stacks. In a 32-bit processor, the first eight bits of an instruction typically specify the opcode for the instruction while the remaining bits specify the operands and/or sub-functions of the instruction. Thus, a typical instruction might be represented as "E8 00 05 03." The histogram can track, for example, all occurrences of individual 32-bit instructions, all instruction having a certain opcode, all occurrences of instructions matching a regular expression such as "E8 00 ?? 03," and/or all occurrences of certain pairs or triplets of instructions, such as a PUSH instruction followed by a POP instruction. In one embodiment of the present invention, the HDF 438 specifies by default that the HGM 436 track the first byte of all 256 different instructions. The generated histogram can be stored in the memory 206, a dedicated file on the hard drive 208, or any other practical location in the computer system 200.

Figure 5:
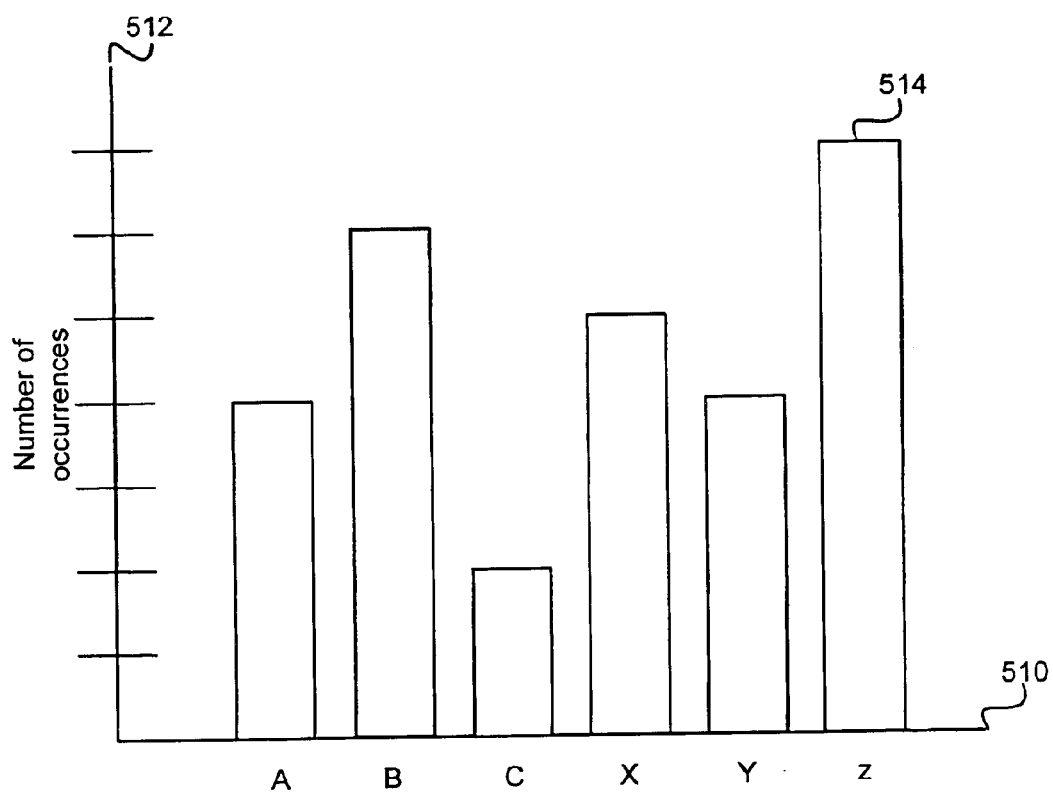
FIG. 5 illustrates an example of a histogram 500 for tracking the occurrences of instructions and/or instruction sequences.

FIG. 5 illustrates an example of a histogram 500 tracking the occurrences of instructions and/or instruction sequences. The horizontal axis 510 enumerates the instructions and/or instruction sequences recorded by the histogram 500 and the vertical axis tracks the number of occurrences of the instructions and/or instruction sequences. Bars 514 on the graph represent the frequency of the respective instruction or instruction sequence. Since the histogram 500 is generated and stored by the computer system 200, the internal representation of the histogram need not resemble the graph illustrated in FIG. 5 but rather can be any suitable representation.

Figure 6:
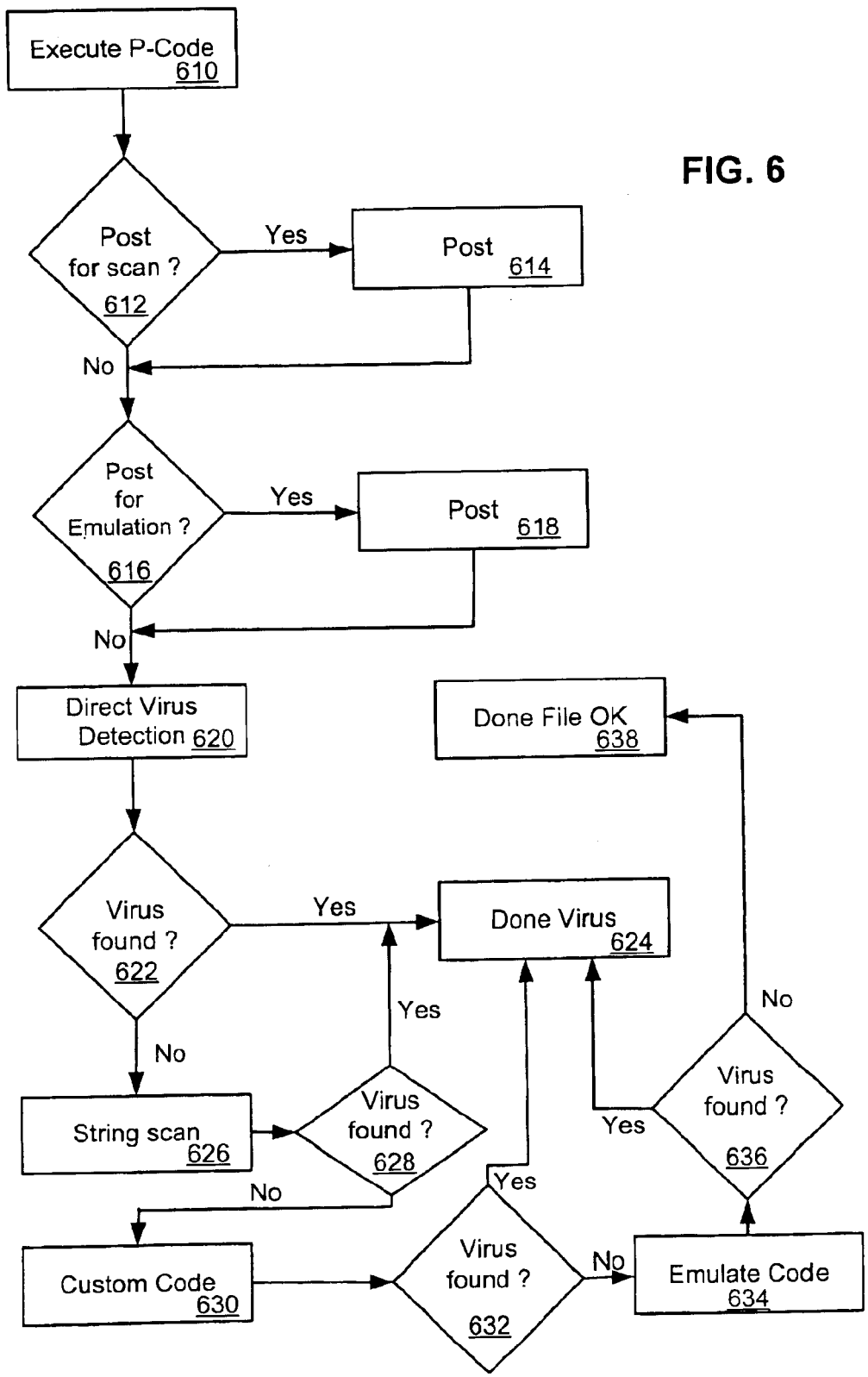
FIG. 6 is a flow chart illustrating steps performed by the VDS 400 according to a preferred embodiment of the present invention.

FIG. 6 is a flow chart illustrating steps performed by the VDS 400 according to a preferred embodiment of the present invention. The behavior of the VDS 400 is controlled by the P-code and, therefore, the VDS 400 has an infinite set of possible behaviors, Accordingly, it should be understood that the steps illustrated in FIG. 6 represent only one possible set of VDS 400 behaviors.

Initially, the engine 414 executes 610 the P-code in the P-code data file 410. Next, the P-code determines 612 which areas of the file 100 should be scanned for virus strings because the areas are likely to contain a simple or encrypted virus. Areas of the file 100 that should be scanned are posted 614 for later scanning. Typically, the main entry point of the PE header and the last section of the file 100 are always posted 614 for string scanning because these are the areas most likely to be infected by a virus. Any other region of the file can be posted 614 for scanning if the regions seem suspicious. For example, if the destination of a JMP or CALL instruction points to a suspicious location in the file 100, it may be desirable to post the areas of the file 100 surrounding both the instruction and the destination.

For other regions of the file 100, the determination of whether to scan is made based on tell-tale markers set by the viruses, such as unusual locations and lengths of sections, or unusual attribute settings of fields within the sections. For example, if the value of an unused field, such as the checksum field 111, is set or the length of a section is suspiciously long, then the P-code posts 614 a region of the section for scanning. Likewise, if a section that is normally not executable is marked as executable, then the P-code preferably posts 614 a region of the section for scanning.

Next, the P-code determines 616 which entry points should be posted 618 for emulating because the entry points are likely to execute polymorphic or metamorphic viruses. The P-code checks the main entry point 103 for known non-viral code. If such code is not found, then the P-code posts the main entry point 103 for emulating. Entry points in other regions of the file 100 are posted 618 for emulating if the code exhibits evidence of viral infection. For example, an entry point in a region of the file 100 is preferably posted for emulating if the checksum 111 in the header contains a suspicious value. When an entry point is posted for emulating, an emulation context, or starting state of the computer system 200, is also specified.

The P-code can also identify 620 viruses in the file 100 without emulating or string searching. This identification is performed algorithmically or stochastically using virus definitions written into the P-code. The virus definitions preferably use the primitives 420 in the interpreter 418 to directly test the file 100 for characteristics of known viruses. For example, if the last five bytes of a file or section have a certain signature found in only one virus, or the file size is evenly divisible by 10, characteristics likely to occur only if the file is infected by certain viruses, then the P-code can directly detect the presence of the virus. In addition, the P-code can be enhanced with algorithms and heuristics to detect the behavior of unknown viruses. If a virus is found 622 by the P-code, the VDS 400 can stop 624 searching and report that the file 100 is infected with a virus.

Scan requests posted by the P-code are preferably merged and minimized to reduce redundant scanning. For instance, a posted request to scan bytes 1000 to 1500, and another posted request to scan bytes 1200 to 3000, are preferably merged into a single request to scan bytes 1000 to 3000. Any merging algorithm known to those skilled in the art can be used to merge the scan requests. Posted emulating requests having identical contexts can also be merged, although such posts occur less frequently than do overlapping scan requests.

If the P-code does not directly detect 622 a virus, the VDS 400 next preferably performs scans on the posted regions of the file 100. The VDS 400 executes 626 the scanning module 424 to scan the posted regions for the virus signatures of simple and encrypted viruses found in the VDF 412. If a virus is found 628 by the scanning module 424, the VDS 400 stops scanning and reports 624 that the file 100 is infected with a virus.

If neither the P-code nor the scanning module 424 detects the presence of a virus, the VDS 400 preferably utilizes a hook to execute 630 custom virus-detection code. The hook allows virus detection engineers to insert custom virus detection routines written in C, C++, or any other language into the VDS 400. The custom detection routines may be useful to detect unique viruses that are not practical to detect via the P-code and string scanning. For example, it may be desired to use faster native code to detect a certain virus rather than the slower P-code. Alternate embodiments of the present invention may provide hooks to custom code at other locations in the program flow. If a virus is found 632 by the custom code, the VDS 400 can stop searching 624 for a virus and report that the file 100 is infected.

If the P-code, scanning module 424, and custom code fail to detect a virus, the VDS 400 preferably executes the emulating module 426. The emulating module 426 emulates 634 the code at the entry points posted by the P-code in order to decrypt polymorphic viruses and trace through code to locate metamorphic viruses. Once enough instructions have been emulated that any virus should become apparent (i.e., enough instructions to decrypt a polymorphic or recognize a metamorphic virus), the emulating module 426 preferably detects a polymorphic virus by using the scanning module 424 to scan pages of virtual memory 434 that were marked as modified or executed through for any virus signatures. The emulating module 426 preferably detects a metamorphic virus by examining the histogram, as described below. If a virus is found 634 by the emulating module 426, the VDS 400 reports 624 that the file 100 is infected. Otherwise, the VDS 400 reports 638 that it did not detect a virus in the file 100.

Figure 7A:
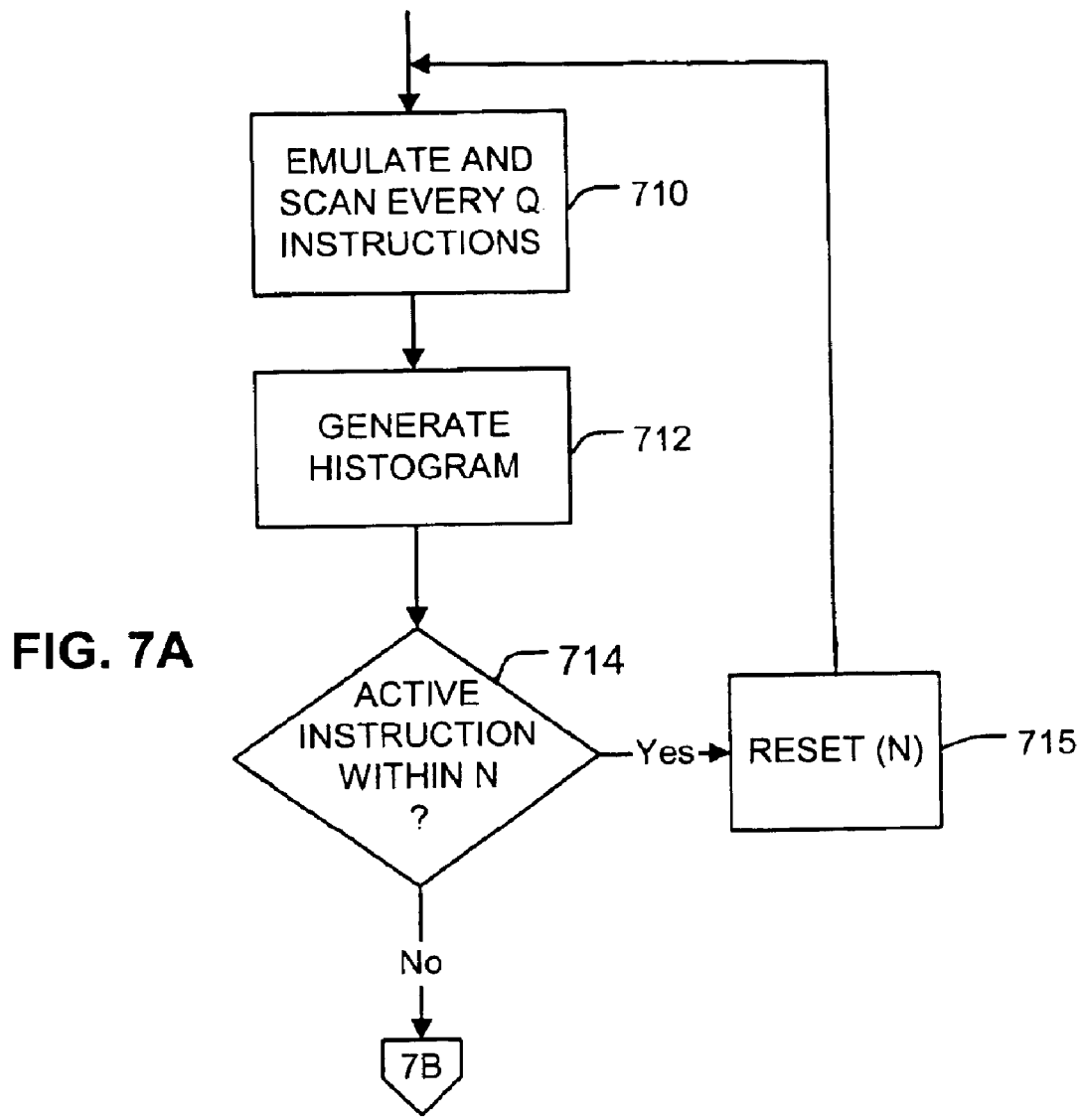
FIG. 7 is a flow chart illustrating the operation of the emulating module 426 according to a preferred embodiment of the present invention.
Figure 7B:
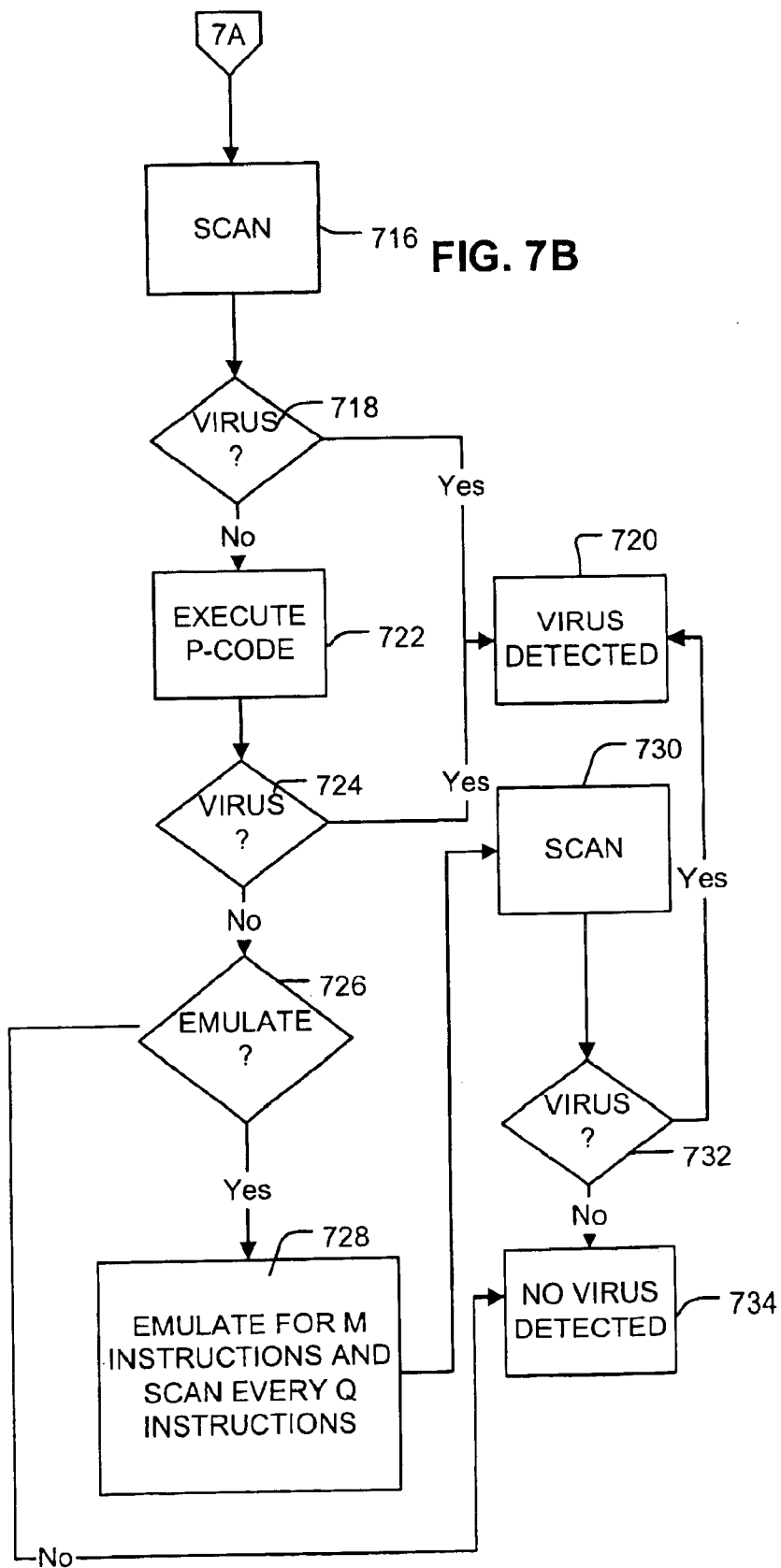

FIG. 7 is a flow chart illustrating the operation of the emulating module 426 at step 634 using histogram-based virus detection logic according to a preferred embodiment of the present invention. Although a preferred embodiment of the present invention uses the histogram-based virus detection techniques in a emulating module 426 that is part of a larger VDS 400, the histogram-based techniques can be used any time emulation is used to detect a virus. Thus, the histogram-based virus detection techniques described herein can be used independently of the VDS 400.

Initially, the CP 428 directs the emulating module 426 to begin 710 emulating the instructions at the posted entry point. While the emulating module 426 emulates the instructions, the HGM 436 generates 712 a histogram of the instructions and/or instruction sequences specified by the HDF 438. During emulation, the emulating module 426 monitors the emulated instructions for "active instructions." An "active instruction" is one or more instructions indicating decryption-like behavior. In one embodiment of the present invention, an active instruction is found when two pairs of instructions read from and write to consecutive memory locations. For example, if a first instruction reads from a first location, a second instruction writes to the first location, a third instruction reads from a second location contiguous with the first location, and a fourth instruction writes to the second location, then there is a high probability that these instruction are performing decryption. Accordingly, these instructions form an "active instruction." Alternatively, the instructions might read from and write to every second memory location, etc. Alternative embodiments of the present invention can use different heuristics to detect an active instruction.

During emulation, the emulating module 426 preferably keeps at least three running counts of emulated instructions. The first count is used to determine when to scan the pages of virtual memory 434 that were emulated through for virus signatures from the VDF 412. In a preferred embodiment of the present invention, the CP 428 directs the scanning module 426 to scan virtual memory every Q instructions. This scan is represented in FIG. 7 within boxes 710 and 728. If the scanning module 424 detects 718 a virus in the virtual memory 434, the VDS 400 reports that a virus was detected (this specific action is not shown in FIG. 7).

The second count is used to determine the number of instructions emulated between active instructions. The second count is preferably reset 715 whenever an active instruction is emulated. The majority of polymorphic viruses should execute an active instruction within N instructions, where N is about 1500 in one embodiment. If 714 the count reaches N, it is likely that a polymorphic virus has finished its decryption stage and, therefore, the emulation is halted.

The third count is used to determine the total number of instruction emulated. In one embodiment, the CP halts emulation 428 if the third count exceeds a maximum number of instructions (this specific action is not shown in FIG. 7).

Whenever emulation is halted, the CP 428 preferably directs the scanning module 424 to scan 716 the pages of the virtual memory 434 that were emulated, read, or written for virus signatures from the VDF 412. If the scanning module 424 detects 718 a virus in the virtual memory 434, the VDS 400 reports 720 that a virus was detected.

If the scanning module does not detect 718 a virus, the CP 428 preferably executes 722 the P-code histogram evaluation program stored in the P-code data file 410. The P-code program preferably examines the histogram generated by the HGM 436 and determines 724 whether the emulated instructions contain a virus based on the presence or absence of histogram-tracked instructions.

For example, assume an anti-virus engineer knows from research that a certain polymorphic virus, VIRUS_ID1, uses opcodes X, Y, and Z. The engineer also knows that the virus uses at least 50 instances of instruction A during a typical decryption phase and that the virus never uses instructions B or C. The engineer can encode this knowledge by creating a P-code routine for analyzing the histogram as follows:

```
If (histogram_count(X)=1 AND
   histogram_count(Y)=1 AND
   histogram_count(Z)=1 AND
   histogram_count(A)>=50 AND
   histogram_count(B)=0 AND
   histogram_count(C)=0) THEN
      virus_detected (VIRUS_ID1);
```

Although the example tracks only opcodes and instructions, the P-code can analyze any data collected by the histogram, such as the frequency of certain pairs of instructions. If the P-code directly determines 724 that the emulated code contains a virus, then the VDS 400 can halt operation and report 720 that the file 100 is infected. Metamorphic viruses can be detected using the same technique by comparing the histogram with known virus instruction usage patterns.

In addition, the P-code can decide 726 whether to extend emulation for another M instructions based upon the analysis of the histogram. For example, the engineer may decide that if the emulated code uses opcodes X, Y, and Z and at least 50 instances of instruction A, and never uses instructions B or C, then the emulation should be extended for another 1000 instructions. The engineer can merely change the last line of the code illustrated above to call extend_emulation(1000) instead of virus_detected(VIRUS_ID1).

If the P-code does not extend emulation, then the VDS 400 preferably reports 734 that a virus was not detected in the emulated instructions. If the P-code extends emulation, then the virtual machine 434 emulates 728 the instructions for another M instructions, where M, in one embodiment, is based on the histogram and, in another embodiment, is a constant applied each time emulation is extended. During this emulation, the emulating module 426 preferably keeps the first count described above and scans the virtual memory 436 for viruses every Q instructions (shown in FIG. 7 by box 728).

Once emulation is halted, the scanning module 424 preferably scans 730 the emulated-through pages of the virtual memory 434. If the scanning module 424 detects 732 a virus in the virtual memory 434, the VDS 400 reports 720 that a virus was detected. Otherwise, the VDS 400 reports 734 that a virus was not detected in the emulated instructions. In this embodiment, the HGM 436 does not need to generate a histogram after the P-code is executed since the P-code is not called again.

In alternative embodiments of the present invention, the P-code is executed again after the emulation is extended (e.g., step 728 loops back to step 710 or 722). In these alternative embodiments, the HGM 436 preferably either continues to update the histogram or generates a new histogram for subsequent evaluation by the P-code. Then, the P-code can detect a virus or optionally extend the emulation one or more additional times beyond the original M-instruction extension based on the histogram. In all alternative embodiments, the virtual memory 434 is preferably scanned every Q instructions and after emulation is halted, as described above.

In sum, the present invention extends emulation of a given file if the instructions executed by the file resemble those used by a known virus strain. This technique limits the number of emulated instructions on clean files but allows the VDS 400 to detect complex polymorphic and metamorphic viruses in infected files.

In addition, the present invention achieves economies of scale because the HGM 436 can be used to collect evidence from many different types of viruses. The HGM 436 effectively monitors all important instructions simultaneously for many viruses. Since anti-virus engineers are adept at extracting instruction-usage information to create hand-coded detection routines, the engineers are typically very good at identifying key viral instruction usage. In order to use the histogram to detect viruses, the engineer only needs to identify instructions that are suspicious and are suspiciously absent in the decryption routine. P-code for identifying the instruction usage pattern can be added to the P-code data file 410 and applied to the histogram with a minimum of work. Thus, the present invention simplifies the process of detecting complex polymorphic and metamorphic viruses.

A preferred embodiment of the present invention also uses histograms to detect the presence of dummy loops in a virus. Some polymorphic viruses use dummy loops to evade detection by delaying decryption of the static viral body for enough instructions that a typical emulator will not emulate the decryption code. The present invention generates histograms for code within suspicious loops and uses P-code to analyze the histograms.

Figure 8:
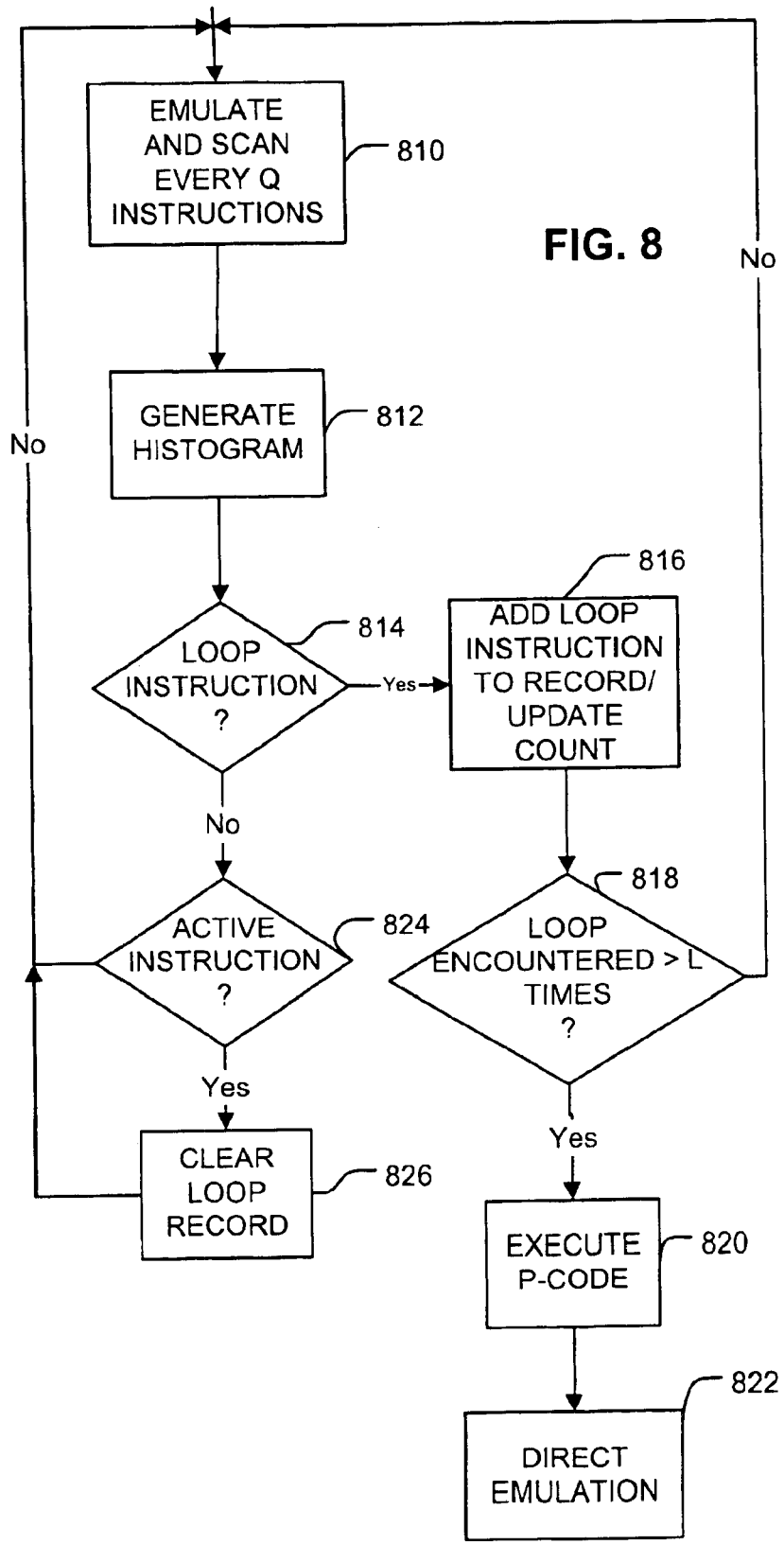
FIG. 8 is a flowchart illustrating steps performed by a preferred embodiment of the present invention to detect dummy loops.

FIG. 8 is a flowchart illustrating steps performed by a preferred embodiment of the present invention to detect dummy loops. The illustrated steps can be performed during the emulation process described with respect to FIG. 7. For example, the dummy loop detection can be integrated into the loop performed by steps 712, 714, and 716. Likewise, the dummy loop detection can be integrated into the emulation extension performed by the P-code at step 728. As mentioned above, alternative embodiments of the present invention can be used as stand-alone modules or integrated into any other environments where the benefits of the present invention are desired. Thus, histogram-based dummy loop detection according to the present invention can be utilized in any environment where emulation is also utilized.

According to a preferred embodiment of the present invention, dummy loop detection occurs as the emulating module 426 is emulating 810 instructions. In a preferred embodiment of the present invention, the emulating module 426 scans virtual memory 434 for viruses every Q instructions, as described above. During emulation, the HGM 436 generates 812 a histogram tracking the emulated instructions. If the dummy loop detection is being performed as part of a larger emulation process, the histogram generated for dummy loop detection (hereinafter referred to as the "loop histogram") is preferably separate from the histogram generated as part of the large emulation process (hereinafter referred to as the "emulation histogram"). The loop histogram can track the usage of any instruction or sequence of instructions specified in the HDF 438. In one embodiment, the HDF 438 contains a separate list of instructions to track for loop histograms.

A "loop instruction" is an instruction with a negative displacement that defines a loop, such as a backward-pointing JMP or CALL instruction. If the emulating module 426 encounters 814 a loop instruction, the emulating module 426 adds 816 the loop instruction to a record of suspicious loop instructions. If a loop instruction is encountered subsequent times, the emulation module 426 preferably updates 816 a counter in the record. Thus, the emulating module 426 maintains a record of suspicious loop instructions and the number of times that each suspicious loop instruction is emulated.

When the emulating module 426 encounters 818 a loop instruction already in the record, the emulating module determines whether the loop instruction has been emulated more than L times. L is preferably any number less than N, where N is the number of instructions emulated without encountering an active instruction described above with respect to step 712. If the dummy loop detection is operating independently from a larger emulation process, then L can be any practical value. If the loop has not been emulated 818 more than L times, then emulation 810 continues.

If, however, the loop has been encountered 818 more than L times, the CP 428 executes 820 the P-code module stored in the P-code data file 410 for analyzing the loop histogram to determine whether the loop is a dummy loop. To provide this functionality to the P-code, anti-virus engineers study dummy loop code of known viruses and determine the dummy loop instruction characteristics of each virus. Then, the engineers generate P-code routines for examining the loop histogram for these characteristics. The engineers may also generate P-code routines for detecting common dummy loop characteristics, thereby extending the functionality of the P-code to detect dummy loops in unknown viruses. If necessary or helpful, the P-code routines can also examine the actual instructions being emulated to make the determination of whether the loop is a dummy loop. Once the P-code has performed the analysis of the loop histogram, the P-code module can direct 822 the emulating module 426 to continue emulating the instructions as-is, skip over the offending loop instruction, or cause emulation to continue from another instruction. Thus, the P-code-based nature of the present invention, coupled with the loop histogram, provides flexibility when performing code analysis. An anti-virus engineer can quickly build a P-code module that can quickly identify and then break out of dummy loops.

If an active instruction is encountered 824, then the emulated instructions are not part of a dummy loop. Accordingly, the emulating module 426 preferably clears 826 the record of suspicious loop instructions and continues emulating.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

I claim:

1. A virus detection system for detecting whether a computer file is infected by a computer virus, the system comprising:

an emulation module for emulating instructions in the computer file;

a record generation module coupled to the emulation module for identifying emulated instructions matching specified characteristics and generating a record counting occurrences of the emulated instructions matching the specified characteristics; and an evaluation module coupled to the record generation module for comparing the generated record with known virus instruction occurrence records to detect the presence of the computer virus.

2. The virus detection system of claim 1, wherein the emulation module comprises:

a module for detecting a decryption instruction, wherein a number of instructions emulated by the emulating module is determined responsive to the detection of the decryption instruction.

3. The virus detection system of claim 1, wherein a number of instructions emulated by the emulation module is dynamically determined responsive to the comparison performed by the evaluation module.

4. The virus detection system of claim 1, further comprising:
a data module coupled to the record generation module for specifying characteristics to be tracked by the record.

5. The virus detection system of claim 4, wherein the characteristics comprise at least one characteristics selected from the group consisting of:
instruction opcodes;
instructions matching a specified bit pattern;
instructions matching a regular expression;
instructions calling an operating system function;
occurrence of groupings of certain instructions; and
values of emulated registers.

6. The virus detection system of claim 1, wherein the record generation module generates a loop record counting occurrences of the instructions matching the specified characteristics inside a loop emulated by the emulation module.

7. The virus detection system of claim 6, wherein the evaluation module evaluates the loop record to determine whether the loop is a dummy loop.

8. A method for detecting the presence of a dummy loop in a computer file infected by a computer virus, the method comprising the steps of:
emulating instructions in the computer file;
generating a histogram of the characteristics of the emulated instructions;
tracking emulations of loop instructions in the emulated instructions; and
responsive to a tracked loop instruction being emulated a number of times, analyzing the histogram to determine whether the loop is a dummy loop.

9. The method of claim 8, further comprising the step of:
responsive to emulating an active instruction, clearing the tracked loop instructions.

10. The method of claim 8, wherein an active instruction is emulated responsive to emulating two pairs of fetch and writ instructions directed to related memory locations.

11. The method of claim 8, wherein the analyzing step comprises the substep of:
comparing the histogram with instruction use characteristics of known viruses to detect the presence of a dummy loop in a known virus.

12. The method of claim 8, wherein the analyzing step comprises the substep of:
comparing the histogram with known dummy loop characteristics to detect the presence of a dummy loop in an unknown virus.

13. The method of claim 8, wherein the step of generating a histogram of the characteristics of the emulated instructions generates a separate histogram for each emulated loop.

14. A method for detecting the presence of a computer virus in a computer file, the method comprising the steps of:
emulating instructions in the computer file;
generating a record counting occurrences of emulated instructions matching specified characteristics;
determining whether a decryption instruction was emulated;
responsive to a positive determination that a decryption instruction was emulated, extending the emulation of instructions in the computer file; and
analyzing the record counting the occurrences of the emulated instructions matching the specified characteristics to determine whether the computer file contains the computer virus.

15. The method of claim 14, further comprising the step of:
determining whether to extend the emulation of instructions in the computer file responsive to the analysis of the record.

16. The method of claim 14, wherein the characteristics tracked by the record comprise at least one characteristic selected from the group consisting of:
instruction opcodes;
instructions calling an operating system function;
instructions matching a specified bit pattern;
instructions matching a regular expression;
occurrences of groupings of certain instructions; and
values of emulated registers.

17. The method of claim 14, wherein the analyzing step comprises the substep of:
comparing the generated record with known virus instruction occurrence records.

18. A computer program product comprising:
a computer usable medium having computer readable code embodied therein for detecting whether a computer file is infected by a computer virus, the computer program product comprising:
an emulation module for emulating instructions in the computer file;
a record generation module coupled to the emulation module for identifying emulated instructions matching specified characteristics and generating a record counting occurrences of the emulated instructions matching the specified characteristics; and
an evaluation module coupled to the record generation module for comparing the generated record with known virus instruction occurrence records to detect the presence of the computer virus.

19. The computer program product of claim 18, wherein the emulation module comprises:
a module for detecting a decryption instruction wherein a number of instructions emulated by the emulating module is determined responsive to the detection of the decryption instruction.

20. The computer program product of claim 18, wherein a number of instructions emulated by the emulation module is dynamically determined responsive to the comparison performed by the evaluation module.

21. The computer program product of claim 18, further comprising:
a data module coupled to the record generation module for specifying characteristics to be tracked by the record.

22. The computer program product of claim 21, wherein the characteristics comprise at least one characteristics selected from the group consisting of:
instruction opcodes;
instruction matching a specified bit pattern;
instructions matching a regular expression;
instructions calling operating system functions;
occurrences of groupings of certain instructions; and
values of emulated registers.

23. The computer program product of claim 18, wherein the record generation module generates a loop record counting occurrences of the instructions matching the specified characteristics inside a loop emulated by the emulation module.

24. The computer program product of claim 23, wherein the evaluation module evaluates the loop record to determine whether the loop is a dummy loop.

25. A method for detecting whether a computer file is infected by a computer virus, the method comprising the steps of;

emulating instructions of the computer virus;

identifying emulated instructions matching specified characteristics;

generating a record counting occurrences of the emulated instructions matching the specified characteristics; and comparing the generated record with known virus instruction occurrence records to detect the presence of the computer virus.

26. The method of claim 25, further comprising:

detecting a decryption instruction; and determining a number of instructions to be emulated responsive to the detection of the decryption instruction.

27. The method of claim 25, further comprising:

specifying characteristics to be tracked by the record.

28. The method of claim 27, wherein the characteristics comprise at least one characteristics selected from the group consisting of:

instruction opcodes;

instruction matching a specified bit pattern;

instructions matching a regular expression;

instructions calling an operating system function;

occurrences of groupings of certain instructions; and values of emulated registers.

* * * * *

UNITED STATES PATENT AND TRADEMARK OFFICE
CERTIFICATE OF CORRECTION

PATENT NO. : 6,971,019 B1 Page 1 of 1
DATED : November 29, 2005
INVENTOR(S) : Carey S. Nachenberg It is certified that error appears in the above-identified patent and that said Letters Patent is hereby corrected as shown below:

<u>Column 16,</u>
Line 57, change "at least one characteristics" to -- at least one characteristic --; and <u>Column 18,</u>
Line 9, change "characteristics" to -- characteristic. --.

Signed and Sealed this

Twenty-first Day of March, 2006

JON W. DUDAS
*Director of the United States Patent and Trademark Office*